United States Patent [19]

Hamada et al.

[11] Patent Number: 4,606,149

[45] Date of Patent: Aug. 19, 1986

[54] DOOR CONSTRUCTION IN MOTOR VEHICLE

[75] Inventors: Eiichi Hamada; Hiroyuki Watanabe, both of Toyota, Japan

[73] Assignee: Toyota Jidosha Kabushiki Kaisha, Japan

[21] Appl. No.: 627,642

[22] Filed: Jul. 3, 1984

[30] Foreign Application Priority Data

Jul. 5, 1983 [JP] Japan ............................ 58-104299[U]

[51] Int. Cl.⁴ ................................................ B60J 5/04
[52] U.S. Cl. ........................................ 49/502; 49/377; 49/493
[58] Field of Search ................. 49/502, 377, 374, 372, 49/493

[56] References Cited

U.S. PATENT DOCUMENTS 4,442,634  4/1984  Kimura ............................ 49/502 X

*Primary Examiner*—Philip C. Kannan
*Attorney, Agent, or Firm*—Finnegan, Henderson, Farabow, Garrett & Dunner

[57] ABSTRACT

A door construction in a motor vehicle, wherein there is provided a door outer panel, which has the upper portion being first inwardly bent in the direction of the door thickness and then upwardly bent in a substantial crank shape, to thereby constitute a ledge portion and an upper end welded flange upwardly extending from the inner end of the ledge portion, the upper end welded flange of the door outer panel is welded to another upper end welded flange of a reinforcing panel, and a belt molding, the width thereof is made smaller at the top portion than at the other portions, covering the outer surface, top end face and inner surface of the welded flanges is solidly secured to the reinforcing panel, the lengths of the upper end welded flanges, which are projected from the ledge portion, of the door outer panel and the reinforcing panel are reduced to the minimum lengths required for welding, and the width in the direction of the door thickness of a belt line portion at the top end of the belt molding is made smaller than a width substantially equal to the weld thickness of the pair of upper end welded flanges.

18 Claims, 2 Drawing Figures

DOOR CONSTRUCTION IN MOTOR VEHICLE

BACKGROUND OF THE INVENTION

1. Field of the Invention

This invention relates to a door construction in a motor vehicle, and more particulary to improvements in a door construction in a motor vehicle, in which the upper end portion of a door outer panel is covered by a belt molding, to thereby constitute a belt line.

2. Description of the Prior Art

There has heretofore been provided a door construction in a motor vehicle, in which, as shown in FIG. 1 for example, there is provided a door outer panel 1, which has the upper portion being first inwardly bent in the direction of the door thickness and then upwardly bent in a substantial crank shape, to thereby constitute a ledge portion 2 and an upper end welded flange 3 upwardly extending from the inner end of this ledge portion 2, the upper end welded flange 3 of the door outer panel 1 is welded to an upper end welded flange 5 of a reinforcing panel 4, and a belt molding 6 covering the outer surface, top end face and inner surface of the welded flanges 3 and 5 is threadably secured to the inner surface of the reinforcing panel 4 through screws 7.

In the drawing, designated at 8 is a door glass, and 9 an outer weather strip coming into contact with the door glass 8 to seal a space formed between the outer side of the door and the door glass 8.

To mention here, recently, there has been proposed a so-called flush surface type motor vehicle in which, as a means of reducing the air resistance during running of the vehicle, all of the outer surfaces of the vehicle body are made flush with one another.

In the above-described flush surface type motor vehicle, it should be quite natural that a difference in stage between the glass of a side door and the door outer panel is decreased as much as possible to thereby minimize the air resistance.

Further, in general, in order to fulfill a satisfactory side view from the motor vehicle, reducing the weight of the vehicle and improving the style of the vehicle, it is desirable to make the door glass portion of the side door large as possible.

However, in the conventional door construction as shown in FIG. 1, the belt molding 6 has a form to cover not only the welded glanges 3 and 5 of the door outer panel 1 and the reinforcing panel 4 but also the screws 7, so that the thickness and height of the belt molding 6 cannot be satisfactorily reduced. As a consequence, limits have been placed upon reducing a difference in stage at this portion between the outer surface of the door glass and the outer surface of the belt molding 6 extending from the door outer panel 1 or enlarging an opening portion for the door glass 8.

Furtheremore, as described above, the top end portion of the belt molding 6, i.e. a belt line portion is large in the width in the direction of the door thickness, and hence, a so-called crescent-shaped difference in stage is generated at a portion where this belt molding 6 intersects a pillar, not shown, of the vehicle body's side, which is disadvantageous in that the air resistance of the motor vehicle is increased and the outer appearance is diminished.

SUMMARY OF THE INVENTION

It is therefore the object of the invention to provide a door construction in a motor vehicle, in which the thickness and height of a belt molding is reduced without changing the construction to a great extent, so that a difference in stage between a door glass and the belt molding can be decreased and an opening portion for the door glass can be enlarged.

To this end, the present invention contemplates that, in a door construction in a motor vehicle wherein there is provided a door outer panel, which has the upper portion being first inwardly bent in the direction of the door thickness and then upwardly bent in a substantial crank shape, to thereby constitute a ledge portion and an upper end welded flange upwardly extending from the inner end of the ledge portion, the upper end welded flange of the door outer panel is welded to another upper end welded flange of a reinforcing panel, and a belt molding, the width thereof is made smaller at the top portion than at the other portions, covering the outer surface, top end face and inner surface of the welded flanges is solidly secured to the reinforcing panel, the lengths of the upper end welded flanges, which are projected from the ledge portion of the door outer panel and the reinforcing panel are reduced to the minimum lengths required for welding, and the width in the direction of the door thickness of a belt line portion at the top end of the belt molding is made smaller than a width substantially equal to the weld thickness of the pair of upper end welded flanges.

To this end, the present invention contemplates that said belt molding is threadably secured to said reinforcing panel at a position downwardly from a superposed portion of said pair of upper end welded flanges.

To this end, the present invention contemplates that an outer door weather strip for sealing a space formed between said belt molding and said door glass is secured to said belt molding such that the outer surface thereof is continuously and smoothly formed from the outer surface of said door outer panel through an outer surface of said belt molding.

To this end, the present invention contemplates that said outer weather strip is previously and integrally secured to said belt molding, to thereby form a belt molding assembly.

To this end, the present invention contemplates that said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

To this end, the present invention contemplates that the welding means for said pair of upper end welded flanges is laser welding, whereby projected lengths of said upper end welded flanges extending upwardly from the ledge portion, which is required for said laser welding, are about 5 mm.

DETAILED DESCRIPTION OF THE PREFERRED EMBODIMENT

Description will now be given of one embodiment of the present invention with reference to the drawings.

Figure 1:
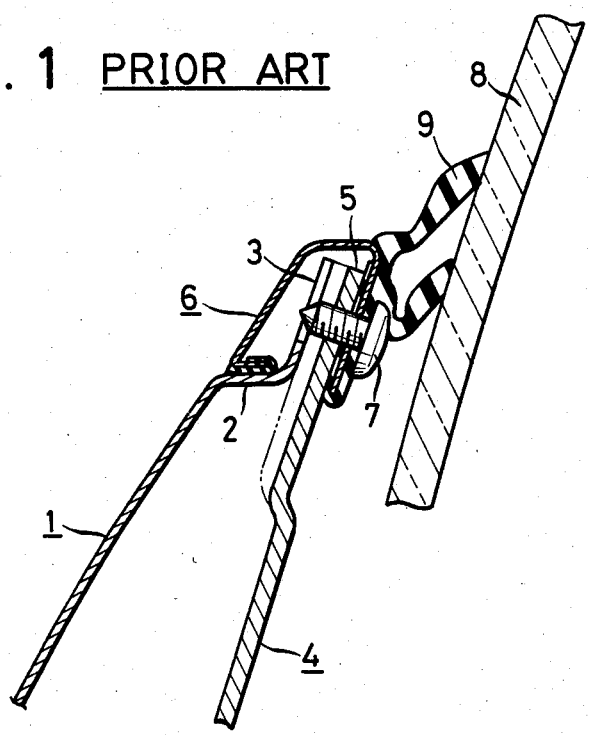
FIG. 1 is sectional view showing the conventional door construction in a motor vehicle.
Figure 2:
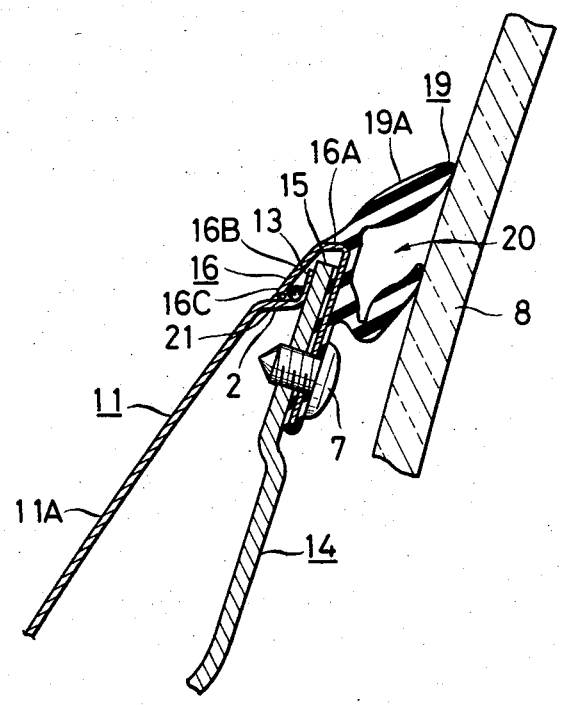
FIG. 2 is sectional view showing an embodiment of the door construction in a motor vehicle according to the present invention.

In the present invention depicted in FIG. 2 similar reference numerals to those in FIG. 1 are used to indicate same or similar parts so that detailed description identifying the elements referred to by those reference numerals will be omitted.

As shown in FIG. 2, in this embodiment, in a door construction in a motor vehicle, wherein there is provided a door outer panel 11, which has the upper portion being first inwardly bent in the direction of the door thickness and then upwardly bent in a substantial crank shape, to thereby constitute a ledge portion 2 and an upper end welded flange 13 upwardly extending from the inner end of the ledge portion 2, the upper end welded flange 13 of the door outer panel 11 is welded to an upper end welded flange 15 of a reinforcing panel 14, and a belt molding 16, the width thereof is made smaller at the top portion than at the other portions, covering the outer surface, top end face and inner surface of the welded flanges 13 and 15 is solidly secured to the reinforcing panel 14, the lengths, which are projected upwardly from the ledge portion 2, of the upper end welded flanges 13 and 15 of the door outer panel 11 and the reinforcing panel 14 are reduced to the minimum lengths required for welding, and the width in the direction of the door thickness of the belt line portion 16A at the top end of the belt molding 15 is made smaller than a width substantially equal to the weld thickness of the pair of upper end welded flanges 13 and 15.

A position where the belt molding 16 is solidly secured to the reinforcing panel 14 through a screw 7 is shifted downwardly from a superposed portion of the pair of welded flanges 13 and 15.

An outer door weather strip 19 for sealing a space formed between the belt molding 16 and the door glass 8 is secured to the belt molding 16 such that an outer surface 19A thereof is continuously and smoothly formed from the outer surface 11A of the door outer panel 11 through an outer surface 16B of the belt molding 16.

Additionally, in this embodiment, the outer weather strip 19 is previously and integrally secured to the belt molding 16, to thereby form a belt molding assembly 20.

Furthermore, in this embodiment, the welding means for the aforesaid pair of upper end welded flanges 13 and 15 is laser welding, whereby projected lengths of the upper end welded flanges 13 and 15 upwardly from the ledge portion 2, which is required for this laser welding, are about 5 mm.

Further, in this embodiment, the upper end welded flange 13 of the door outer panel 11 is made shorter in the length projected from the ledge portion 2 than the upper end welded flange 15 of the reinforcing panel 14, and, as commensurate therewith, the upper portion of the outer surface 16B of the belt molding 16 is greatly inclined to the door glass 8.

Designated at 21 is a protector secured to a hemmed outer bottom end portion 16C of the belt molding 16 and adapted to come into contact with the outer surface 11A of the door outer panel 11.

In this embodiment, the lengths, which are projected from the ledge portion 2, of the upper end welded flanges 13 and 15 of the door outer panel 11 and the reinforcing panel 14, are limited to the minimum lengths required for the welding, so that the belt molding 16 can be minimized in the thickness and height thereof.

Particularly, the welding of the pair of upper end welded flanges 13 and 15 is effected by the laser welding which requires a small stock for welding, so that the belt molding can be further reduced in the thickness and height thereof.

Further, in addition to the above, the upper end welded flange 13 of the door outer panel 11 is shorter in the length projected from the ledge portion 2 than the upper end welded flange 15 of the reinforcing panel 14, whereby the outer surface 16B of the belt molding 16 is greatly inclined, so that the width of the belt molding 16 in the direction of the door thickness at the belt line portion 16A can be reduced.

Moreover, in this embodiment, the screws 7 for threadably securing the belt molding 16 are positioned downwardly of the welded flanges 13 and 15, the height of the welded flanges 13 and 15 can be considerably reduced, and, as commensurate therewith, the height of the belt molding 16 surrounding the welded flanges can be reduced.

The thickness of the upper end of the belt molding 16, i.e. the dimension of the belt molding in the direction of the door thickness is not necessitated to enclose the screw 7 for threadably securing the belt molding 16, so that the aforesaid thickness can be reduced to a considerable extent.

Furthermore, in this embodiment, the outer weather strip 19 for sealing a space formed the door outer panel 11 and the door glass 8 has its outer surface smoothly continued to the outer surface of the belt molding 16, a difference in stage between the outer surface of the door outer panel 11 and the outer surface of the door glass 8 is eliminated, so that the air resistance can be reduced during running of the vehicle and the outer appearance of the vehicle can be improved.

Further, the so-called crescent-shaped difference in stage formed at the intersection of the belt molding 16 and the pillar, not shown, can be reduced.

Additionally, in the above embodiment, the pair of upper end welded flanges 13 and 15 have been welded by the laser welding; however, the present invention need not necessarily be limited to this, and the welded flanges may be welded by any other means such, for example, such as the arc welding.

However, in the case of the laser welding, the length required for the welding is short, so that the belt molding can be reduced in dimensions.

In the above embodiment, the width in the direction of the door thickness of the belt line portion 16A at the top end of the belt molding 16 has been made substantially equal to the weld thickness of the pair of upper end welded flanges 13 and 15 however, the present invention includes the cases where the width in the direction of the door thickness of the belt line portion 16A at the top end of the belt molding 16 is slightly larger or smaller than the weld thickness of the pair of upper end welded flanges 13 and 15.

In the above embodiment, the belt molding 16 has been fixed to the reinforcing panel 14 through the screw 7, however, the present invention need not necessarily be limited to this, and the fixing may be made by any other means such as clips.

What is claimed is:

1. A door construction in a motor vehicle, wherein there is provided a door outer panel, which has the upper portion being first inwardly bent in the direction of the door thickness and then upwardly bent in a substantial crank shape, to thereby constitute a ledge portion and an upper end welded flange upwardly extending from the inner end of said ledge portion, said upper end welded flange of the door outer panel is welded to another upper end welded flange of a reinforcing panel, and a belt molding, the width thereof is made smaller at the top portion than at the other portions, covering the outer surface, top end face and inner surface of said welded flanges is solidly secured to said reinforcing panel, characterized in that the lengths of said upper end welded flanges, which are projected from the ledge portion of the door outer panel and the reinforcing panel are reduced to the minimum lengths required for welding, and the width in the direction of the door thickness of a belt line portion at the top end of said belt molding is made smaller than a width substantially equal to the weld thickness of the pair of upper end welded flanges.

2. A door construction in a motor vehicle as set forth in claim 1, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

3. A door construction in a motor vehicle as set forth in claim 2, wherein the welding means for said pair of upper end welded flanges is laser welding, whereby, projected lengths of said upper end welded flanges upwardly from the ledge portion, which is required for said laser welding are about 5 mm.

4. A door construction in a motor vehicle as set forth in claim 1, wherein said belt molding is threadably secured to said reinforcing panel at a position downwardly from a superposed portion of said pair of upper end welded flanges.

5. A door construction in a motor vehicle as set forth in claim 4, wherein an outer door weather strip for sealing a space formed between said belt molding and said door glass is secured to said belt molding such that the outer surface thereof is continuously and smoothly formed from the outer surface of said door outer panel through an outer surface of said belt molding.

6. A door construction in a motor vehicle as set forth in claim 5, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

7. A door construction in a motor vehicle as set forth in claim 6, wherein the welding means for said pair of upper end welded flanges is laser welding, whereby, projected lengths of said upper end welded flanges upwardly from the ledge portion, which is required for said laser welding are about 5 mm.

8. A door construction in a motor vehicle as set forth in claim 5, wherein said outer weather strip is previously and integrally secured to said belt molding, to thereby form a belt molding assembly.

9. A door construction in a motor vehicle as set forth in claim 8, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

10. A door construction in a motor vehicle as set forth in claim 9, wherein the welding means for said pair of upper end welded flanges is laser welding, whereby, projected lengths of said upper end welded flanges upwardly from the ledge portion, which is required for said laser welding are about 5 mm.

11. A door construction in a motor vehicle as set forth in claim 4, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

12. A door construction in a motor vehicle as set forth in claim 11, wherein the welding means for said pair of upper end welded flanges is laser welding, whereby, projected lengths of said upper end welded flanges upwardly from the ledge portion, which is required for said laser welding are about 5 mm.

13. A door construction in a motor vehicle as set forth in claim 1, wherein an outer door weather strip for sealing a space formed between said belt molding and said door glass is secured to said belt molding such that the outer surface thereof is continuously and smoothly formed from the outer surface of said door outer panel through an outer surface of said belt molding.

14. A door construction in a motor vehicle as set forth in claim 13, wherein said outer weather strip is previously and integrally secured to said belt molding, to thereby form a belt molding assembly.

15. A door construction in a motor vehicle as set forth in claim 14, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

16. A door construction in a motor vehicle as set forth in claim 15, wherein the welding means for said pair of upper end welded flanges is laser welding, whereby, projected lengths of said upper end welded flanges upwardly from the ledge portion, which is required for said laser welding are about 5 mm.

17. A door construction in a motor vehicle as set forth in claim 13, wherein said upper end welded flange of the door outer panel is made shorter in the length projected from the ledge portion than said upper end welded flange of the reinforcing panel, and, as commensurate therewith, the upper portion of the outer surface of the belt molding is greatly inclined to the door glass.

18. A door construction in a motor vehicle as set forth in claim 17, wherein the welding means for said pair of upper end welded flanges is laser welding, whereby, projected lengths of said upper end welded flanges upwardly from the ledge portion, which is required for said laser welding are about 5 mm.

* * * * *